April 2, 1957  E. W. HAWKINSON  2,787,089
BUFFING MACHINE FOR PNEUMATIC TIRE CASINGS
Filed Aug. 10, 1954  3 Sheets-Sheet 2
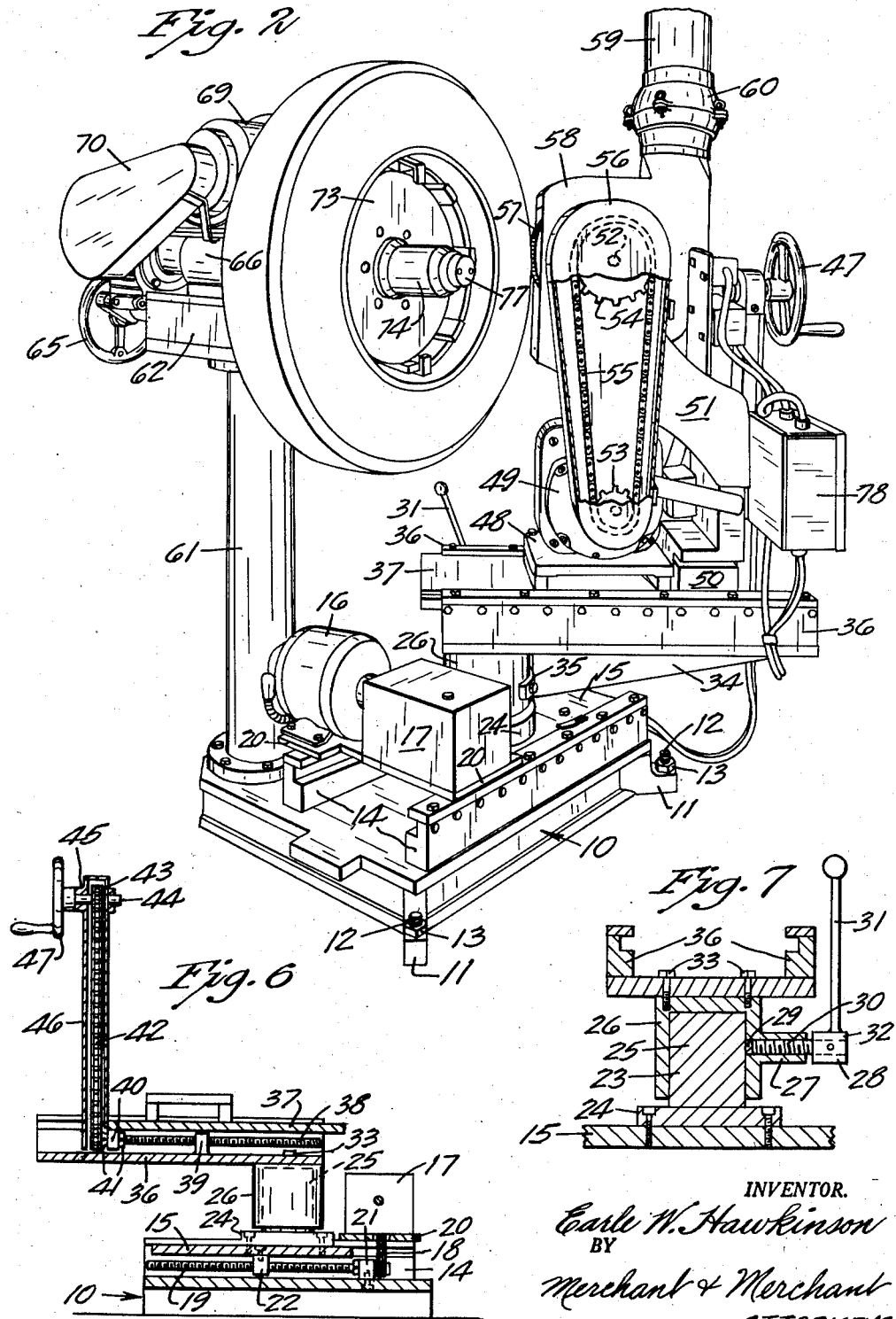
INVENTOR.
Earle W. Hawkinson
BY
Merchant & Merchant
ATTORNEYS

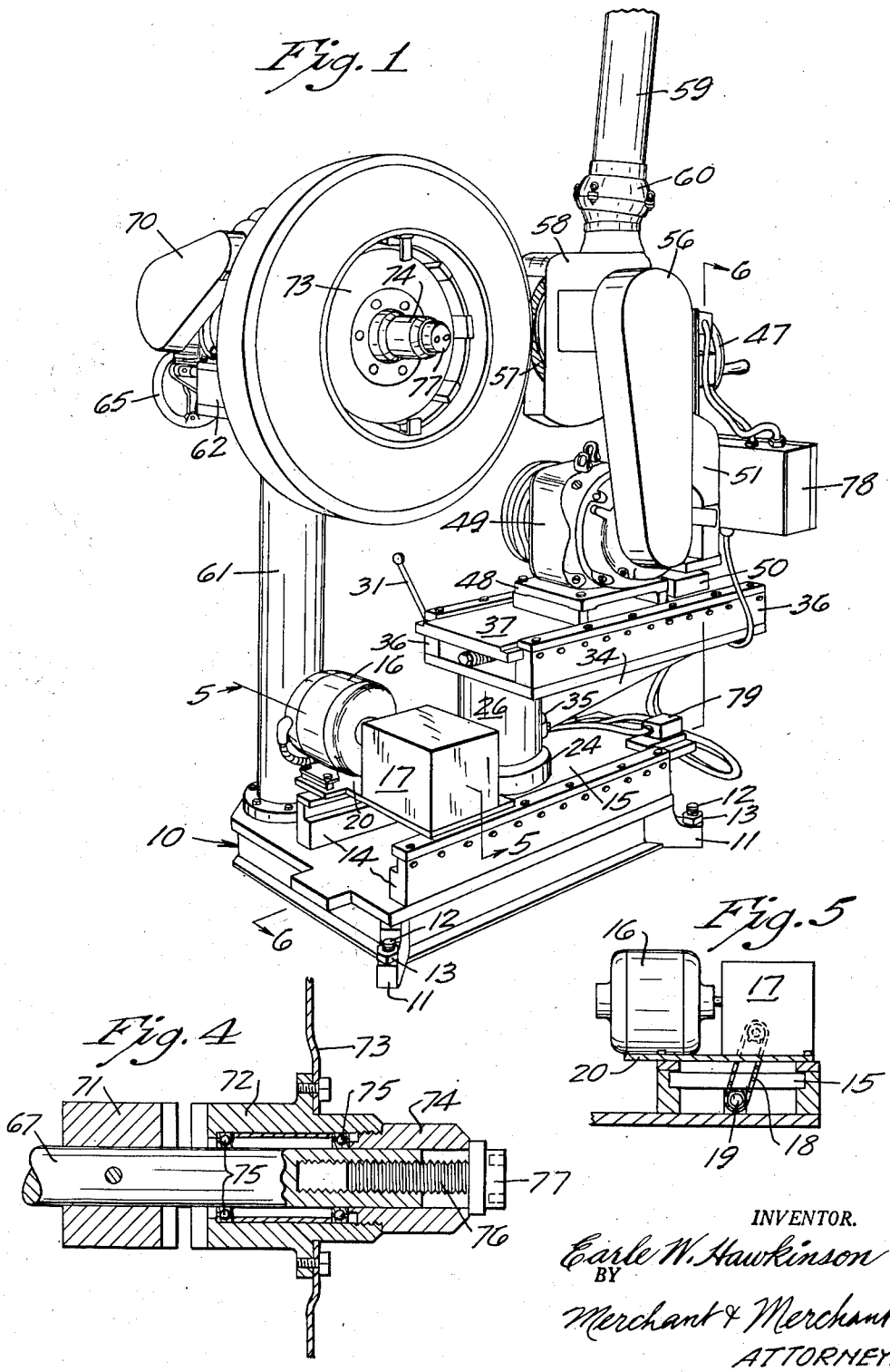

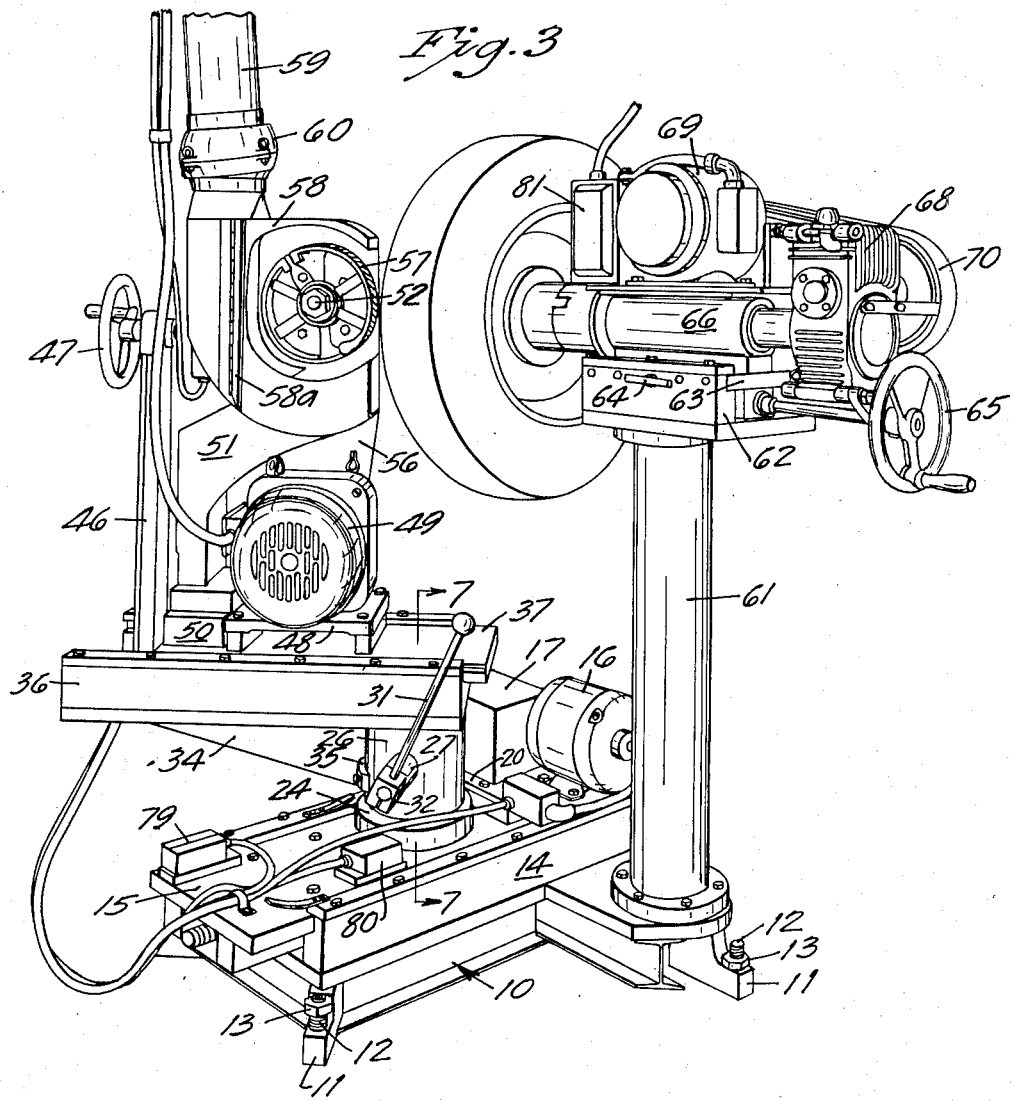

United States Patent Office 2,787,089
Patented Apr. 2, 1957

2,787,089

BUFFING MACHINE FOR PNEUMATIC TIRE CASINGS

Earle W. Hawkinson, Minneapolis, Minn., assignor to Paul E. Hawkinson Company, Minneapolis, Minn., a corporation of Minnesota Application August 10, 1954, Serial No. 448,913

3 Claims. (Cl. 51—33)

My invention relates to an improved tire buffing machine. In particular, it relates to a novel and improved tire buffing machine constructed and arranged to buff or finish a tire in connection with a retreading operation.

It is a common practice to buff or abrade a worn tire to bring the tread and shoulder portions thereof into the desired form and to true up said tread and shoulder portions before a new tread is placed on the tire.

It is an object of my invention to provide a novel and improved tire buffing machine which is able, accurately and comparatively simply, to buff the tread and shoulders of a worn tire so that they are properly trued on the desired arc or curve.

It is another object of my invention to provide a novel and improved buffing machine which is sturdier and more stable in operation than any other buffing machine now known in the art.

It is another object of my invention to provide in an improved buffing machine, an adjustment of the position of the tire with respect to the buffing wheel whereby the shoulder of the tire may be accurately buffed at the desired position without changing the relative horizontal position of the buffing wheel with respect to its oscillatory axis.

It is a further object of my invention to provide in an improved buffing machine a tire supporting member freely rotatable on a motor driven shaft and an improved clutch for connecting said member into engagement with said shaft, so that the tire supporting member may be in engagement with the shaft during the buffing operation and may be disengaged for testing the balance of the tire.

These and other objects and advantages will be disclosed in the course of the following specification and claims, reference being had to the accompanying drawings wherein:

Fig. 1 is a view in perspective of my invention;

Fig. 2 is a view in perspective, with some parts broken away, of the structure of Fig. 1 showing my invention in a different position than as shown in Fig. 1;

Fig. 3 is a view in perspective of my invention in the position of Fig. 2 but viewed from a different side;

Fig. 4 is a fragmentary view in cross section of the wheel-carrying spindle of my invention;

Fig. 5 is a view in end elevation substantially on line 5—5 of Fig. 1, some parts being removed;

Fig. 6 is a view in vertical cross section substantially on line 6—6 of Fig. 1 on a reduced scale, some parts being removed; and Fig. 7 is a fragmentary detail view in axial section taken substantially along line 7—7 of Fig. 3, some parts being removed.

Referring more particularly to the drawings, reference numeral 10 indicates a base which is the primary support for my invention. Base 10 is provided with outwardly projecting feet 11 having extending vertically through their ends leveling screws 12 which are provided with locking nuts 13. Fixedly secured to the base 10 is a longitudinally extending slide support or guideway 14 and fitted therein for longitudinal movement in opposite directions in a horizontal plane is a slide 15. Movement of slide 15 is controlled by a reversible motor 16, the drive thereof extending through a gear box 17 and drive chain 18 to a feed screw 19, as shown more clearly in Figs. 5 and 6. Motor 16 and gear box 17 are fastened to a plate 20 which is secured to the slide support 14. Referring in particular to Fig. 6, feed screw 19 is journalled for rotation in a sleeve 21 secured to the base 10. A nut-acting member 22 secured to slide 15 has threaded engagement with the feed screw 19 so that rotation of feed screw 19 by drive chain 18 moves the nut-acting member 22 longitudinally and therewith the slide 15. The direction of movement of slide 15 along its longitudinal axis is dependent upon the direction of rotation of reversible motor 16.

Secured to the slide 15 for movement therewith is a standard 23 having a base 24 and a vertically projecting cylindrical portion 25. A movable vertical support 26 in the nature of a supporting sleeve is mounted on cylindrical portion 25 of the standard 23 for rotation relative thereto about a vertical axis. Movable member 26 has a laterally projecting internally threaded boss 27 adapted to receive a friction lock 28 comprising a friction block 29, a screw portion 30 which contacts the friction block 29 to move it into locking engagement with cylindrical portion 25, and a vertically projecting handle 31 secured to an enlarged head 32 of the screw portion 30. Secured to the movable support 26 by bolts 33, and a triangular support member 34, having an arcuate-shaped flange 35, is a second longitudinally extending slide support or guideway 36. Fitted for longitudinal movement toward and away from the vertical axis of rotation of movable member 26 within slide support 36 is a slide 37.

Referring in particular to Fig. 6, the movement of slide 37 is controlled by a feed screw 38 having threaded engagement with a nut-acting member 39 secured to the slide support 36. Feed screw 38 is journalled for rotation in a sleeve 40 secured to the slide 37 and positioned between spaced thrust collars 41 carried by the feed screw 38. A chain 42 extends vertically between one end of feed screw 38 and a sprocket wheel 43 secured to a shaft 44 journalled in end 45 of a chain housing 46 which is carried by the slide 37. A hand wheel 47 rotates the shaft 44 and sprocket wheel 43 to rotate the feed screw 38. The rotation of feed screw 38 moves it longitudinally relative to nut-acting member 39 and therewith the slide 37 with respect to the slide support 36. Thus, the slide 37 is movable longitudinally in opposite directions toward and away from the vertical axis of rotation of movable member 26; the direction of longitudinal movement dependent on the direction of rotation of hand wheel 47.

Secured to slide 37 is a motor mounting 48 to which is secured a motor 49. Mounted on slide 37 adjacent motor mounting 48 is a block support 50 to which is secured a substantially S-shaped standard 51 which is positioned to support a shaft 52 vertically above the drive shaft of motor 49. The shaft 52 is mounted for rotation about a horizontal axis which is at right angles to the vertical plane of the axis of longitudinal movement of slide 37. The rotation of shaft 52 is accomplished through a sprocket wheel 53 secured to the drive shaft of motor 49, a sprocket wheel 54 secured to the shaft 52 and drive chain 55 extending therebetween. A housing 56 encloses sprocket wheels 53 and 54 and chain 55. Secured to shaft 52 for rotation therewith is a grinding wheel 57 which is partially enclosed by a hood 58 secured to the standard 51 and having a side door 58a. Hood 58 communicates with suction means not shown in the drawings through conduit 59 having a ball and socket joint 60 to withdraw the material abraded from the tire by grinding wheel 57.

Fixedly secured to the base 10 is a fixed vertical support 61 in the nature of an upright column to which is secured a third slide support on guideway 62. Fitted within slide support 62 for longitudinal movement in opposite directions perpendicular to a vertical plane parallel to the line of horizontal movement of slide 15 and movable vertical member 26 is a slide 63. The position of slide 63 in the slide support 62 may be fixed by means of a set screw 64. The longitudinal movement of slide 63 with respect to slide support 62 is effected by the rotation of a feed screw, not shown in the drawings, but which may be similar to the feed screw 38. The movement of the feed screw adjustment for slide 63 is effected through the rotation of a hand wheel 65. Secured to slide 63 for movement therewith is a shaft housing 66 which mounts a shaft 67 for rotation about the axis of longitudinal movement of slide 63. The rotation of shaft 67 is effected through gear reduction means 68, motor 69, and a drive connection enclosed within a housing 70, which may be similar to the sprocket and chain drive connection between the drive shaft of motor 49 and shaft 52.

Referring in particular to Fig. 4, secured to the shaft 67 is an indented boss 71 positioned adjacent and adapted to cooperate as a clutch with a toothed hub 72 of a tire-supporting member 73 in the nature of a rimmed wheel. Hub 72 is in threaded engagement with a sleeve 74; and both are freely rotatable on shaft 67 by virtue of bearings 75. Means for moving the teeth of hub 72 into engagement with the indentations of boss 71 comprises a screw 76 positioned longitudinally in the end of shaft 67 and having a head 77 abutting sleeve 74 so that moving screw 76 into the shaft 67 moves hub 72 longitudinally toward and into engagement with boss 71. Screw 76 may be removed completely from the end of shaft 67 so that hub 72 and sleeve 74 may be removed from the shaft 67 to facilitate the positioning of a tire on the tire-carrying member 73.

A junction box 78 is secured to standard 51 from which wiring extends to the motors 16 and 49 and to limit switches 79 and 80 which act to limit the travel of slide 15 in each direction. Current is supplied to motor 69 through a junction box 81.

The operation of my invention is as follows: A tire casing is applied to the tire supporting member 73 while it is positioned off of the shaft 67. It is then positioned on the shaft 67 and screw 76 is moved inwardly to maintain working engagement of boss 71 and hub 72. Slide 63 is maintained in a central fixed position with respect to slide support 62 by tightening set screw 64. The tire is now positioned for buffing; and the grinding wheel 57 must now be adjusted to buff the tire tread along the proper arc or curve. This is accomplished by adjusting the position of slide 37 to the proper distance from the vertical axis of rotation of movable member 26 by rotating hand wheel 47. This relationship determines the desired arc or curve so that when grinding wheel 57 is oscillated about the vertical axis of movable member 26 the proper convex surface will be given to the tire casing tread. Reversal motor 16 is then operated to move the grinding wheel 57 into proper grinding relationship against the tread of the tire casing. Friction lock 28 is released so that movable member 26 is freely rotatable about the cylindrical portion 25 of standard 23 and grinding wheel 57 is swung to the desired position for starting on the desired portion of the tire. Motors 69 and 49 are turned on to rotate respectively the tire and buffing wheel in opposite directions. Grinding wheel 57 is now oscillated against the tread of the tire casing and progressively advanced against the tire casing until the tread surface of the tire is quickly and accurately buffed and trued on the proper arc and curve.

For buffing a shoulder of the tire, grinding wheel 57 is moved to the position shown in Figs. 2 and 3 and is locked in this position by setting the friction lock 28. Set screw 64 is now released so that slide 63 is movable horizontally and the tire is moved into grinding relationship by the rotation of hand wheel 65. By this important adjustment it is possible to maintain the relationship between the adjustment of slide 37 with respect to the vertical axis of movable member 26 and yet properly and accurately buff the shoulder of the tire. This adjustment facilitates the speed and ease of buffing first the tread and then the shoulders of many tires along the same arc or transverse curvature successively.

The material which is abraded from the tire will be drawn into hood 58 and through conduit 59 to be discharged remote from the working area. This material is mostly in the form of fine dust so that instead of having a great cloud or mass of dust in the room, the dust and dirt are all discharged so that the atmosphere in the room is kept clean.

After buffing the tread and shoulders of the tire, screw 76 may be loosened in the shaft 67 so that hub 72 and sleeve 74 are freely rotatable thereon; and the tire may now easily and effectively be tested for balance and for making allowance for balance in the application of a new tread.

From the above description, it will be seen that I have provided a novel and improved buffing machine to properly buff the tread and shoulders of a worn tire so that they are properly trued on the desired shape; and it is clear, that I have provided a structure which can be built of very sturdy construction and will be very stable in operation. The machine has been amply demonstrated in actual practice and found to be very successful and efficient.

It will be obvious to those skilled in the art that my invention may be modified by many substitutions and equivalents and that this disclosure is intended to be illustrative only. Therefore, I intend to be limited solely by the scope of the appended claims.

What I claim is:

1. A tire buffing machine, comprising, in combination, a base, a fixed upright column rigidly secured to said base, a first longitudinally extending generally horizontally disposed slide supporting guideway rigidly secured to the upper portion of the column, a first slide slidably mounted in said first guideway for longitudinal movement therein, means for longitudinally moving said first slide to and fro in opposite directions in said first guideway, a first shaft rotatably journalled on said first slide and longitudinally movable therewith, power means for rotating said first shaft, said first shaft being adapted to carry a tire casing for rotational movement about and axial horizontally translational movement along the longitudinal axis of the first shaft, a second longitudinally extending generally horizontally disposed slide supporting guideway secured to the base, said second guideway being spaced from said column in the direction of longitudinal movement of said first slide and horizontally below a tire casing mounted on the first shaft, a second slide slidably mounted in said second guideway for longitudinal movement therein, said longitudinal movement of the second slide being normal to the longitudinal movements of both the first slide and the first shaft, power means for longitudinally moving said second slide to and fro in opposite directions in said second guideway, a third longitudinally extending generally horizontally disposed slide supporting guideway, a third slide slidably mounted in said third guideway for controlled longitudinal movement therein, means for longitudinally moving said third slide to and fro in opposite directions in said third guideway, mounting means pivotally mounting said third guideway on said second slide for rotation about a substantially vertical axis with said controlled longitudinal movement of said third slide being radial of said vertical axis at all times, said mounting means comprising a pair of cooperating members rotatable with respect to each other, one of said members being rigidly secured to said second slide for movement therewith and the other member being rigidly secured to the third guideway, a second shaft carried by said third slide and movable therewith, said second shaft extending axially in a direction normal to the direction of controlled longitudinal movement of said third slide, a buffer wheel rotatably carried by said second shaft for rotational movement about the axis thereof, power means for rotating said second shaft, the longitudinal movement of the third slide being operative to adjust the radius of the buffing arc, the first and second slides being operative to bring a tire casing and the buffing wheel together for proper buffing of a tire tread or shoulder portion, the second slide initially adjusting the buffing wheel into a buffing position and thereafter controlling the depth of the buffing with the adjustment of the first slide being generally for buffing a tire shoulder portion, with the radial adjustment of the third slide being fixed through the adjustment of the first and second slides.

2. The structure set forth in claim 1 wherein said one member of the mounting means is an upright standard having a vertically disposed cylindrical portion and the other member of the mounting means is a vertically disposed cylindrical sleeve-like support journalled in concentric relationship on the cylindrical portion of the upright standard.

3. The structure set forth in claim 2 together with a friction lock operative to releasably secure the cooperating members of the mounting means against relative rotational movement in any desired circumferential position.

References Cited in the file of this patent

UNITED STATES PATENTS

| | | |
|---|---|---|
| 1,561,861 | Kmentt | Nov. 17, 1925 |
| 1,756,908 | Baumberger | Apr. 29, 1930 |
| 1,827,637 | Andrews | Oct. 13, 1931 |
| 2,243,461 | Haskins | May 27, 1941 |
| 2,553,528 | D'Avaucourt | May 15, 1951 |
| 2,610,446 | Hawkinson | Sept. 16, 1952 |